Figure 4:
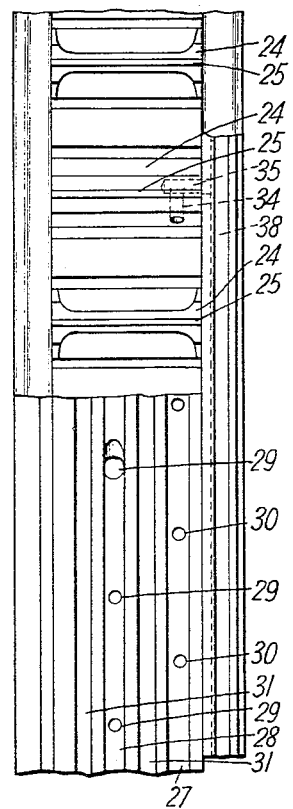

Aug. 23, 1955     R. H. D. CHAMBERLIN     2,715,834
TRANSMISSION GEARING, INCLUDING MEANS FOR MEASURING TORQUE
Filed Feb. 23, 1954     3 Sheets-Sheet 1
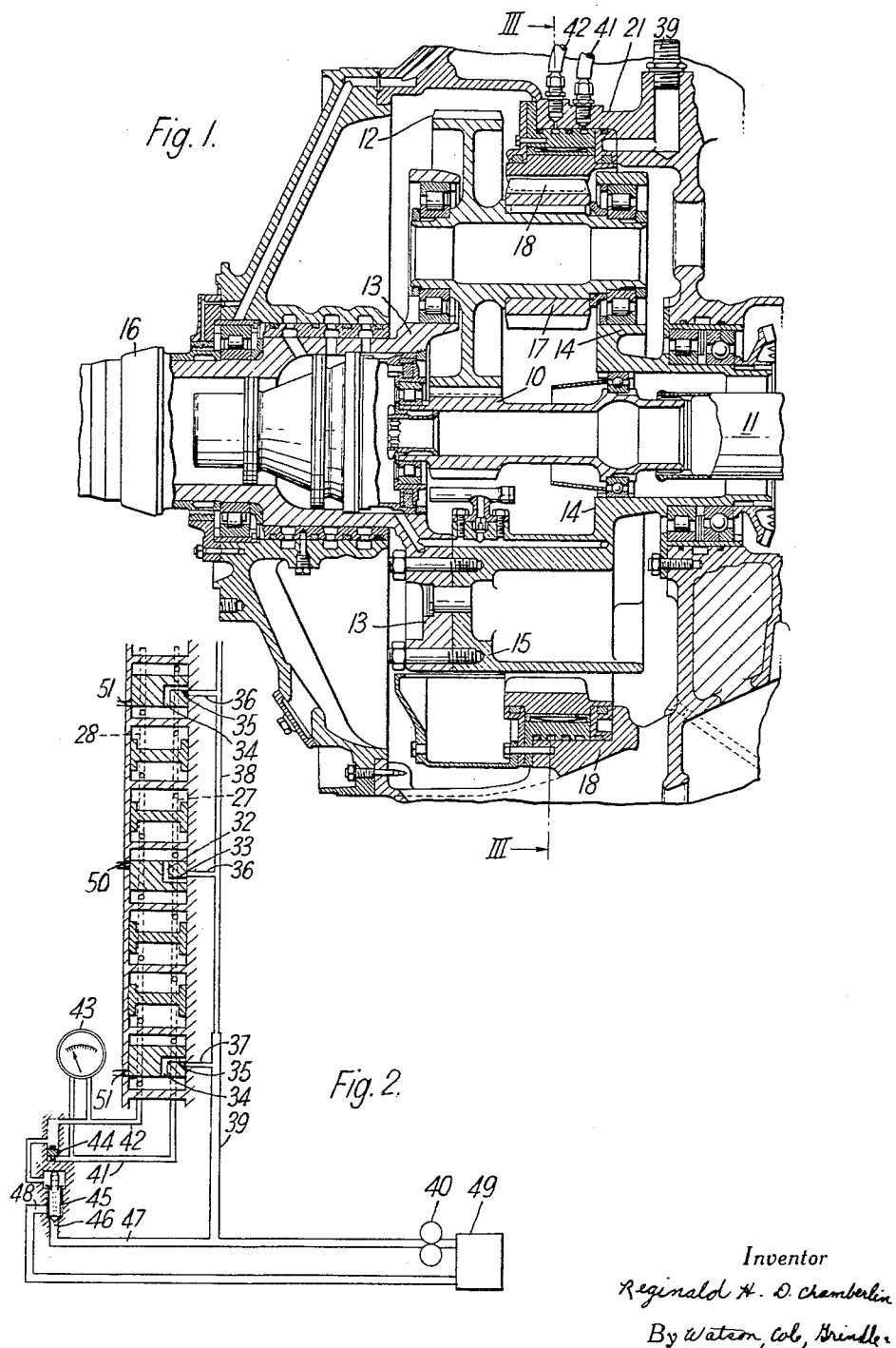
Inventor
Reginald H. D. Chamberlin
By Watson, Cole, Grindle & Watson
Attorneys Aug. 23, 1955  R. H. D. CHAMBERLIN  2,715,834
TRANSMISSION GEARING, INCLUDING MEANS FOR MEASURING TORQUE
Filed Feb. 23, 1954  3 Sheets-Sheet 2

Inventor
Reginald H. D. Chamberlin
By Watson, Cole,
Grindle & Watson
Attorneys

Aug. 23, 1955 R. H. D. CHAMBERLIN 2,715,834
TRANSMISSION GEARING, INCLUDING MEANS FOR MEASURING TORQUE
Filed Feb. 23, 1954 3 Sheets-Sheet 3

Inventor

By

Attorney

United States Patent Office 2,715,834
Patented Aug. 23, 1955

2,715,834

TRANSMISSION GEARING, INCLUDING MEANS FOR MEASURING TORQUE

Reginald Henry Douglas Chamberlin, London, England, assignor to D. Napier & Son Limited, London, England, a British company Application February 23, 1954, Serial No. 411,957

Claims priority, application Great Britain February 27, 1953

4 Claims. (Cl. 73—136)

This invention relates to transmission gearing including means for measuring torque and of the kind in which the gearing is of the epicyclic type and torque is measured by means arranged to be responsive to the torque reaction on a reaction element of the gearing.

In epicyclic transmission gearing according to the present invention comprising a driving element, a driven element and a reaction member, the reaction member forms with a fixed member an annular or part-annular chamber coaxial with the sun wheel of the epicyclic gearing and divided circumferentially into a number of substantially liquid tight pockets by radial projections, hereinafter called vanes, on the reaction member and the fixed member with the vanes on the reaction member alternating with those on the fixed member, and means for measuring the fluid pressure set up in liquid contained in the appropriate pockets by the torque reaction of the reaction member during transmission of power through the gearing.

The term "liquid tight" is here used to indicate that ideally the pockets would be liquid tight. It will be understood, however, that this ideal cannot in practice be achieved and that leakage will occur continuously from the pockets in which fluid pressure is maintained. In order to replace continuously liquid which escapes by leakage from the pockets, means are conveniently provided for supplying liquid continuously to the appropriate pockets at a pressure greater than that which will occur in the pockets due to torque reaction, and for automatically reducing or shutting off such supply to the pockets as and when the reaction member moves under the action of the fluid pressure in the pockets against the torque reaction beyond a predetermined point. Thus in practice the rate at which liquid will be supplied to the pockets will be always only that which is just sufficient to maintain therein the exact pressure necessary to resist the torque reaction on the reaction member.

Conveniently the reaction member itself and the fixed member are together formed to constitute a valve which automatically shuts off the supply of liquid to the appropriate pockets from the source of liquid pressure when the reaction member moves under the action of the liquid pressure in the appropriate pockets beyond a predetermined point, but separate valve apparatus operated by relative movement between the reaction member and the fixed member could be employed.

It will be apparent that only liquid in alternate pockets will be subject to pressure due to torque reaction on the reaction member. The arrangement is, therefore, conveniently such that the alternate pockets in which liquid is not under pressure due to torque reaction are connected to an exhaust or a low pressure line. Moreover, the arrangement is preferably such that if and when there is reversal of torque reaction on the reaction member, the movement of the reaction member causes the pockets which previously contained liquid under pressure due to torque reaction to be connected to exhaust or a source of low pressure and the other series of pockets to be connected to the source of high pressure so as to be filled with liquid under a pressure sufficient to withstand the reaction of the reversed torque, means being provided, it will be understood for cutting off the pockets now containing liquid under pressure due to torque reaction from the source of liquid under pressure as and when the reaction member moves beyond a predetermined point under the action of such pressure.

According to a further feature of the invention the pressure fluid is supplied by a pump, relief valve apparatus being provided to by-pass surplus fluid delivered by the pump. It will be apparent that the arrangement must be such as to provide fluid pressure under maximum torque conditions adequate for maintaining the supply of fluid at the required pressure to the appropriate pockets. If a normal pressure relief valve having a fixed opening pressure were provided, therefore, the setting of the valve would have to be such as to open only when the maximum working pressure had been achieved and the pump would therefore operate at all times under maximum load. In order to avoid this disadvantage, especially when starting-up and/or idling, according to a further feature of the invention relief valve apparatus is provided which is so constructed and arranged as to open when the pressure in the delivery passage from the pump exceeds the pressure in the appropriate pockets by a predetermined amount. It will be appreciated that this can be achieved in a simple arrangement by providing a pressure relief valve on which the pressures respectively in the delivery passage from the pump and in the appropriate pockets act in opposite directions, while a spring pressure tends in addition always to maintain the valve closed against the pump delivery pressure so that the valve opens automatically whenever the pump delivery pressure exceeds the pressure in the pockets by the amount represented by the force of the spring. Thus, assuming that the pressure required in the pump delivery passage to open the valve against the spring force alone be 50 pounds per square inch, this valve will open whenever the delivery pressure of the pump exceeds the pressure in the pockets by this amount.

Figure 3:
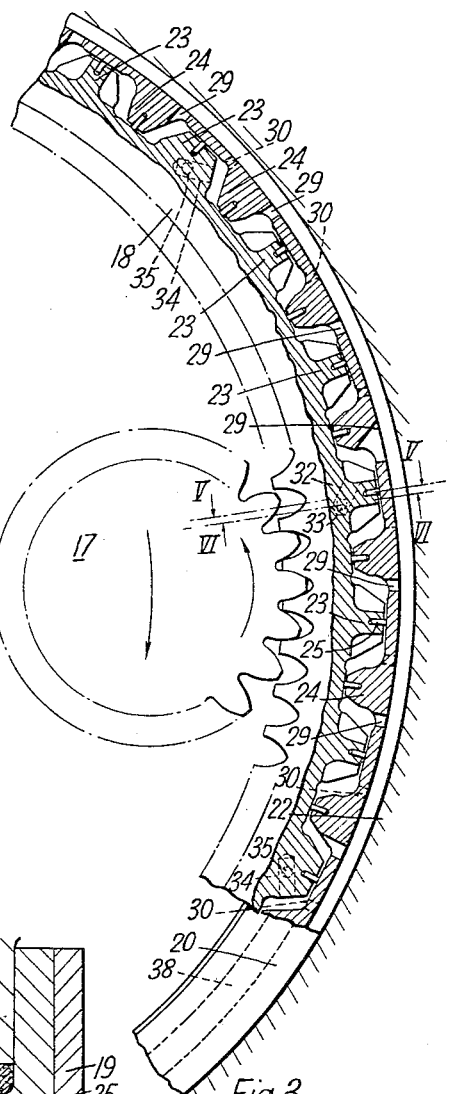
Figure 5:
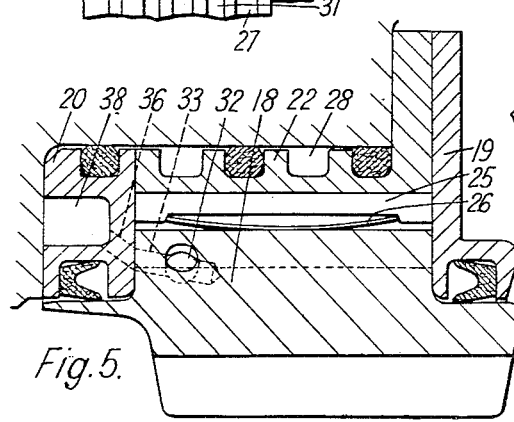
Figure 7:
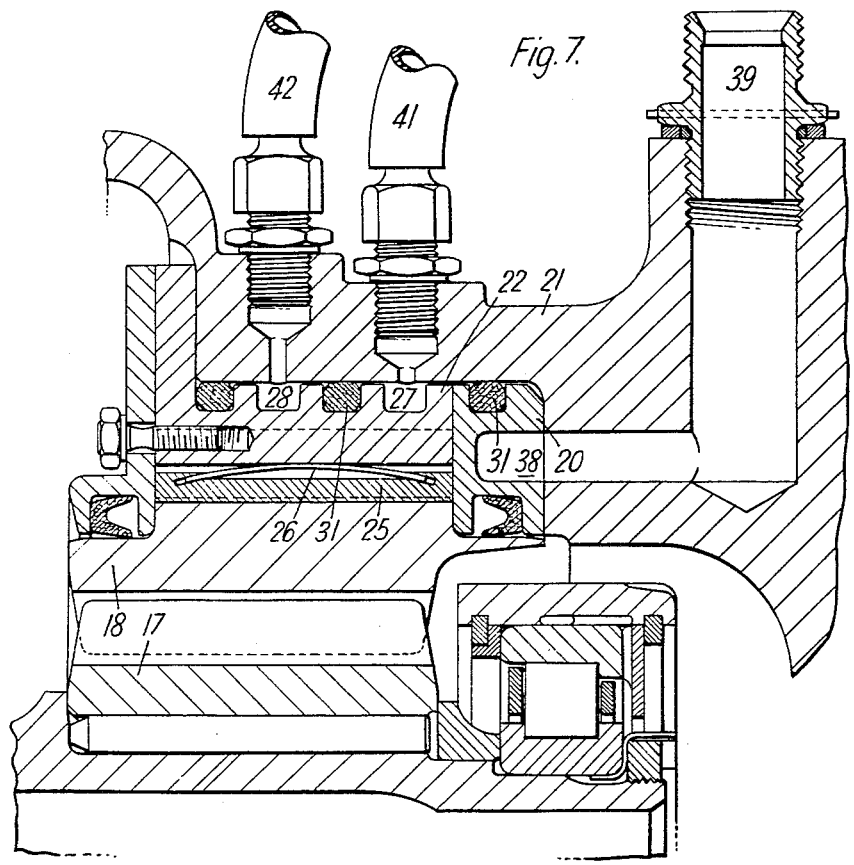
Figure 6:
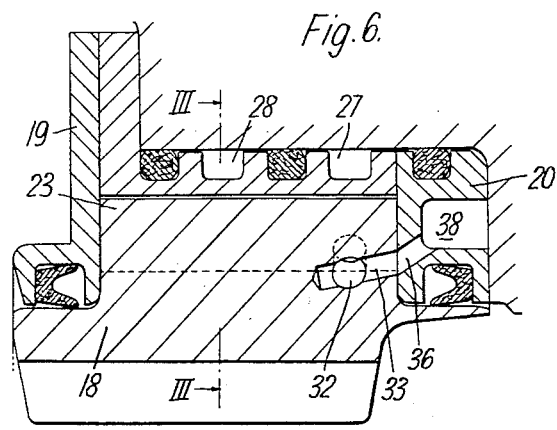

The invention may be performed in various different ways but one form of the invention as applied to an epicyclic gear constituting a reduction gear between a power shaft and the propeller of an aircraft propulsion plant will now be described by way of example with reference to the accompanying drawings in which:

Figure 1 is a sectional view through the reduction gearing,

Figure 2 is a diagrammatic layout of the hydraulic circuit associated with the gearing, Figure 3 is fragmentary cross sectional view on the line III—III of Figure 1, Figure 4 is a composite development, the upper part of the figure representing the external development of the toothed ring which constitutes the reaction member, while the lower part of the figure represents the external development of a fixed ring surrounding the reaction member, Figure 5 is a sectional view through the toothed ring on the line V—V of Figure 3, Figure 6 is a sectional view through the toothed ring on the line VI—VI of Figure 3, and Figure 7 is an enlarged sectional view through the toothed ring and adjacent parts in the plane of Figure 1.

The gearing comprises a sun pinion 10 which in this case constitutes the driving member of the gear and is connected to a driving shaft 11, which is itself connected to the turbo-compressor power output shaft (not shown) of the power plant. The sun pinion 10 meshes with a series of planet pinions 12 rotatably carried in a spider, comprised by two discs 13 and 14 interconnected by hollow pillars 15, the spider being rotatable about the axis of the sun pinion 10. The spider is rigidly connected to a driven shaft 16 which is in turn connected to the propeller (not shown) of the aircraft.

Each planet pinion 12 is mounted for rotation with a smaller diameter planet pinion 17 arranged coaxially therewith, and each planet pinion 17 is arranged to mesh with an internally toothed annulus ring 18 which constitutes the reaction member of the epicyclic gearing.

The reaction ring 18 is located in an axial direction by end plates 19 and 20 rigidly secured to the gear casing 21, and is surrounded by an annular member 22 (hereinafter referred to for convenience as the fixed ring) also secured to the casing. The reaction ring 18 forms with the fixed ring 22, from which it is spaced by a radial clearance, an annular chamber which is divided circumferentially into a number of substantially fluid-tight pockets by radial tooth-like projections 23 on the reaction ring and similar tooth like projections 24 on the fixed ring. Each such tooth-like projection is formed with an open sided slot in which is located a sealing vane 25 which is urged into close contact with the adjacent surface of the cooperating ring by a spring 26. The outwardly extending projections on the reaction ring 18 are arranged alternately with the inwardly extending projections on the fixed ring 22, and in the present example the total number of fluid pockets formed between these projections is approximately 60.

The external circumferential surface of the fixed ring 22 is formed with two annular grooves 27 and 28, which together with the casing 21 provide a pair of annular fluid galleries (hereinafter referred to for convenience as the "forward" and "reverse" torque galleries respectively). The annular galleries 27 and 28 are sealed by means of annular sealing rings 31 arranged in annular grooves formed in the fixed ring 22 and in the end plate 20. The fluid pockets formed between the reaction ring and on the fixed ring may be regarded as comprising two series, consisting respectively of a first series of alternate pockets in which fluid pressure will tend to be created when the torque reaction on the reaction ring is in one direction, and a second series of alternate pockets in which fluid pressure will tend to be created when the torque reaction on the reaction ring is in the other direction.

All the fluid pockets in one series are connected to the "reverse" torque gallery 28 via circumferentially spaced radial drillings 29, while all the pockets in the other series are connected to the "forward" torque gallery 27 via another series of spaced radial drillings 30.

Certain of the tooth-like projections 23 on the reaction ring 18 have passages 32 formed therein and leading from selected fluid pockets of one series to ports 33 (hereinafter referred to as fluid inlet control ports) in one of the end faces of the reaction ring. In the present example these fluid inlet control ports are provided in every sixth tooth-like projection 23 on the reaction ring. Other tooth-like projections on the reaction ring, equally spaced between the projections referred to immediately above, are provided with similar passages 34 leading from selected pockets of the other series of pockets to further inlet control ports 35 in the same end face of the reaction member.

The fluid inlet control ports 33 and 35 associated respectively with the two series of fluid pockets are arranged to cooperate with fluid pressure supply ports 36 and 37 formed in the end plate 20, the fluid pressure ports 36 and 37 all communicating with an annular pressure gallery 38 to which gallery fluid is delivered under pressure through a conduit 39 by means of a positive displacement gear pump 40. The end faces of the reaction ring 18 make substantially fluid tight engagement with the adjacent faces of the end plates 19 and 20, and the ports 33 and 35 therefore cooperate with the ports 36, 37 to act as fluid control valves controlling the delivery of fluid from the pump 40 to one or other of the series of pockets.

The "forward" and "reverse" torque galleries 27 and 28 are connected through fluid conduits 41 and 42 to a fluid pressure indicating device 43, which provides an indication of the pressure in whichever of the galleries is at any moment greater and thus of the value and direction of the reaction torque exerted on the reaction ring by the gearing. The pressure indicating device 43 may be of known kind and will not therefore be described in detail.

Associated with the two fluid conduits 41 and 42 is a shuttle type change-over valve 44 having inlet ports connected to the conduits 41 and 42, and an outlet port connected to one side of a spring-pressed relief valve 45. The change-over valve 44 acts to connect whichever of the lines 41 and 42 is at higher pressure at any instant to the relief valve 45, while the other of the lines 41 and 42 is isolated therefrom. The pressure relief valve 45 is provided with a pressure inlet port 46 which is connected through a conduit 47 to the outlet side of the pump 40. The valve 45 is also provided with a spill port 48 which is connected to a sump or reservoir 49 from which fluid is supplied to the pump 40. The valve 45 is so arranged that whenever pressure in the conduit 47 exceeds by a predetermined amount (say 50 lbs. per square inch) the pressure in whichever of the lines 41 and 42 is at any moment higher amount, the valve opens to permit fluid to discharge through the waste port 48 to the reservoir 49. The shuttle valve 44 in conjunction with the relief valve 45 thus acts to ensure that the pump 40 is not forced to pump against an outlet pressure which exceeds by more than a predetermined amount the pressure built up in the fluid pockets by the reaction torque exerted on the reaction ring.

The two galleries 27 and 28 are also connected to a second shuttle-type change-over valve 50, which is so arranged that the gallery which at any instant contains fluid at a lower pressure is connected to a relief conduit 51, while the gallery at the higher pressure is isolated from this relief conduit.

The arrangement and disposition of the fluid inlet control ports 33 and 35 and the fluid pressure supply ports 36 and 37 is such that, when the reaction ring 18 is subject to torque reaction in either direction, it tends to move in a direction to open communication between the appropriate fluid pressure supply ports 36 or 37 and the fluid inlet control ports 33 or 35 leading to whichever of the series of pockets in which fluid pressure is then required to resist such torque reaction, while communication between the other fluid inlet control ports and fluid pressure ports is cut off.

Thus, fluid under pressure is automatically delivered to those pockets in which it is required to resist the torque reaction.

The pressure at which the fluid is supplied by the pump 40 and controlled by the valves 44 and 45 is moreover greater than that required in the pockets to resist the reaction, so that if the fluid inlet control ports 33 or 35 remained open the reaction ring 18 would be moved into a limiting position. It will be apparent, however, that if at any moment the fluid pressure in the appropriate series of pockets becomes greater than that necessary to resist the torque reaction the reaction ring will move to close the appropriate fluid inlet control ports 33 or 35, as the case may be, and thus prevent any further pressure build up, so that in practice a fluid pressure is always maintained in the appropriate series of pockets exactly corresponding to the torque reaction on the toothed ring. This pressure, and hence the reaction torque, is indicated by the instrument 43.

What I claim as my invention and desire to secure by Letters Patent is:

1. Epicyclic transmission gearing comprising a sun pinion, at least one planet pinion, a rotary carrier supporting the axis of said planet pinion and an internally toothed annulus ring constituting a reaction member and surrounding and engaging the planet pinion, a fixed member surrounding the annulus ring and forming therewith an annular chamber which surrounds the entire circumference of the ring, and lies coaxial with the main rotary axis of the gearing, projections on said annulus ring and on said fixed member arranged alternately within said annular chamber and forming a number of substantially fluid-tight pockets therein, and means for measuring the pressure set up in fluid in the appropriate pockets by the torque reaction of the annulus ring during transmission of power through the gearing.

2. Epicyclic transmission gearing as claimed in claim 1, including means for supplying fluid to the appropriate pockets at a pressure greater than that which will occur in the pockets due to torque reaction and in which the annulus ring and the fixed member are provided with parts which cooperate, under the relative movement of the two members, to constitute a valve which automatically controls the supply of fluid to and hence the pressure within the appropriate pockets, to a value sufficient to balance the reaction torque on the annulus ring, the said parts being arranged also to isolate the fluid pressure supply from one series of alternate pockets, and to connect the pressure supply to the other series of alternate pockets, when the annulus ring moves beyond a predetermined position caused by a reversal of the direction of power transmission through the gearing.

3. Epicyclic transmission gearing comprising a driving element, a driven element, at least one planet pinion, and a reaction member in the form of an internally toothed annulus ring engaging the planet pinion, a fixed member forming with the annulus ring an annular chamber surrounding the entire circumference of the annulus ring and lying coaxial with the main rotary axis of the gearing, projections on said annulus ring and on said fixed member arranged alternately within said annular chamber and forming a number of substantially fluid-tight pockets therein, means for supplying fluid to the appropriate pockets at a pressure greater than that which will occur in the pockets due to torque reaction, means for automatically controlling the supply of fluid to these pockets as and when the annulus ring moves under the combined reaction of the fluid pressure in the pockets and of the reaction load on the annulus ring, and means for providing an indication of the fluid pressure in the pockets.

4. Epicyclic transmission gearing as claimed in claim 3, in which the source of fluid pressure comprises a continuously driven pump, and including a pressure relief valve in the outlet side of said pump, arranged to by-pass surplus fluid delivered by the pump to relief when the pressure on the outlet side of the pump exceeds by a predetermined value the pressure in whichever series of alternate pockets is at any instant greater.

References Cited in the file of this patent

UNITED STATES PATENTS

| 2,322,182 | Walker | June 15, 1943 |
| 2,562,710 | Gallo et al. | July 31, 1951 |
| 2,651,197 | Crookston | Sept. 8, 1953 |